No. 844,743. PATENTED FEB. 19, 1907.
S. E. PRESSLER.
GUARD FOR STREET RAILWAY CARS.
APPLICATION FILED JUNE 16, 1906.
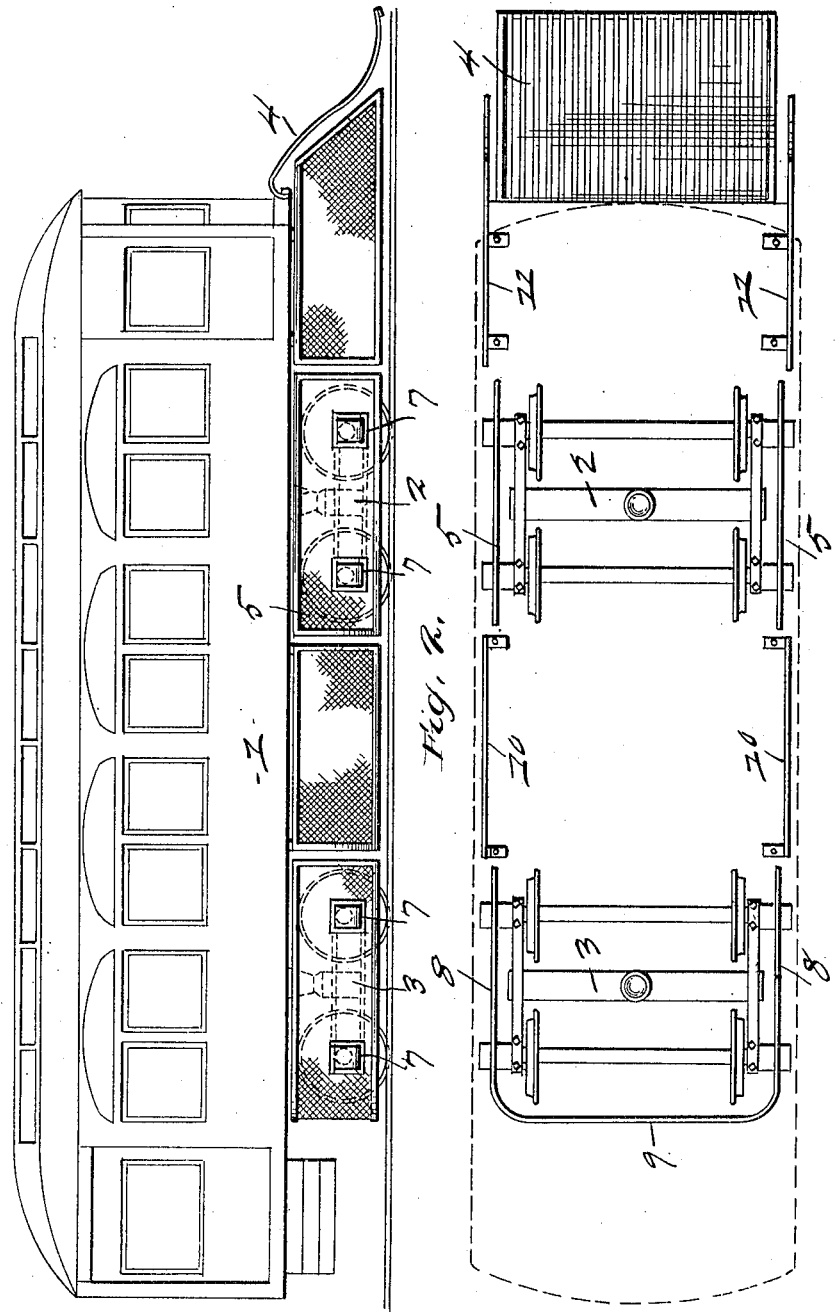

UNITED STATES PATENT OFFICE.

SUSIE E. PRESSLER, OF TOLEDO, OHIO.

GUARD FOR STREET-RAILWAY CARS.

No. 844,743.　　　　Specification of Letters Patent.　　　　Patented Feb. 19, 1907.

Application filed June 16, 1906. Serial No. 321,968.

*To all whom it may concern:*

Be it known that I, SUSIE E. PRESSLER, of Toledo, county of Lucas, and State of Ohio, have invented certain new and useful Improvements in Guards for Street-Railway Cars; and I do hereby declare that the following is a full, clear, and exact description thereof, which will enable others skilled in the art to which it appertains to make and use the same, reference being had to the accompanying drawings, and to the figures of reference marked thereon, which form part of this specification.

My invention relates to safety-guards or fenders for street-railway cars; and it has for its object to provide means the employment of which shall practically insure against the possibility of an individual being mangled by the wheels of a car.

Where a fender is attached to the forward end only of a car, there is no provision to prevent the body of an individual from falling beneath the wheels from the side of the car-track, the forward fender without additional guarding means being entirely inadequate to guard the wheels.

In carrying out my invention I provide guard-sections attached to the sides of the trucks and movable therewith and stationary guard-sections attached to the car-body at the sides between the front and rear trucks and the front truck and the fender on the forward end of the car.

In the accompanying drawings, Figure 1 is an elevation of a car, showing my improvement attached thereto. Fig. 2 is a plan view showing the relative disposition and arrangement of the guard-sections, the car-body being shown in broken outline.

Referring to the details, 1 indicates the body of a car having pivoted front and rear trucks 2 and 3, respectively, and provided at its forward end with the usual fender 4. To the sides of the front truck are secured guard-sections 5. Any suitable means may be employed to secure the sections 5 to the truck, and in the means shown the sections are provided with rectangular interior openings 7, adapted to closely fit around the journal-boxes of the truck. The lids of the boxes are therefore exposed and permit ready inspection of the journals without disturbing the guard-sections. The rear truck is in like manner provided at the sides with guarding means, shown as a single U-shaped section 8, having the transverse portion 9 disposed to the rear of the rear truck. Section 8 is also provided with rectangular openings fitting around the journal-boxes of the rear truck and maintaining said section in position. Attached to the bottom of the car-body at the sides are stationary guard-sections 10, extending between the movable sections upon the front and rear trucks. In like manner there are attached to the bottom of the car-body guard-sections 11, extending between the sections upon the front truck and the fender upon the front end of the car. It is apparent that if the stationary guard-sections 10 and 11 were exactly in line with the movable sections upon the trucks the ends of the sections would contact and interfere when the trucks turn upon their pivots as the car rounds a curve. To obviate such interference, the stationary guard-sections are disposed out of line with the movable guard-sections of the trucks, the stationary sections being outside the plane of the movable sections, as shown in Fig. 2. The guard-sections are preferably of wire-lattice construction with a border-frame of metal, this construction insuring lightness; but the same may be constructed of sheet metal or otherwise to insure the necessary lightness and strength.

From the foregoing description it is apparent that my invention largely eliminates the present danger to life and limb accompanying the operation of street-railway cars equipped with the usual front fender only. Where my invention is employed, it is impossible for the body of an individual to fall beneath a car in the path of the wheels.

Having described my invention, what I claim, and desire to secure by Letters Patent, is—

1. The combination with a car-body having pivoted front and rear trucks and provided with a fender at its forward end, of guard-sections secured to and movable with the trucks, and stationary guard-sections secured to the car-body between the front and rear trucks and the front truck and the fender, substantially as described.

2. The combination with a car-body having pivoted front and rear trucks and provided with a fender extending across its forward end, of guard-sections secured to the sides of and movable with the front truck, and guard-sections secured to the car-body between the front truck and the fender, substantially as described.

3. The combination with a car-body having front and rear trucks and provided with a fender across its forward end, of guard-sections attached to the sides of and movable with the trucks, and stationary guard-sections attached to the car-body between the front and rear trucks and between the front truck and the fender, the stationary guard-sections being out of line with the movable guard-sections, substantially as described.

4. The combination with a car-body having pivoted front and rear trucks and provided with a fender at its forward end, of guard-sections attached to the sides of the trucks and movable therewith, and stationary guard-sections attached to the car-body between the front and rear trucks and between the front truck and the fender, the stationary sections being disposed outside the plane of the movable sections, substantially as described.

In testimony that I claim the foregoing as my own I affix my signature in presence of two witnesses.

SUSIE E. PRESSLER.

Witnesses:
CARL H. KELLER,
R. E. WRIGHT.